(12) United States Patent
Morita et al.

(10) Patent No.: US 8,976,430 B2
(45) Date of Patent: Mar. 10, 2015

(54) DOCUMENT READER

(75) Inventors: Kenji Morita, Toride (JP); Akiko Kanno, Kashiwa (JP); Satoshi Seki, Abiko (JP); Yohei Katto, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 201 days.

(21) Appl. No.: 13/316,048

(22) Filed: Dec. 9, 2011

(65) Prior Publication Data

US 2012/0154879 A1 Jun. 21, 2012

(30) Foreign Application Priority Data

Dec. 17, 2010 (JP) ................................. 2010-282234

(51) Int. Cl.
- G03F 3/08 (2006.01)
- H04N 1/60 (2006.01)
- G06K 9/00 (2006.01)
- H04N 1/407 (2006.01)

(52) U.S. Cl.
CPC ..................................... H04N 1/407 (2013.01)
USPC ............................. 358/518; 358/1.9; 382/167

(58) Field of Classification Search
None
See application file for complete search history.

(56) References Cited

U.S. PATENT DOCUMENTS

| | | | | |
|---|---|---|---|---|
| 5,210,600 A | * | 5/1993 | Hirata | 358/527 |
| 6,195,180 B1 | * | 2/2001 | Taguchi et al. | 358/461 |
| 6,229,627 B1 | * | 5/2001 | Taguchi et al. | 358/461 |
| 6,611,360 B1 | * | 8/2003 | Kataoka | 358/461 |
| 7,817,317 B2 | * | 10/2010 | Ito | 358/516 |
| 8,164,804 B2 | * | 4/2012 | Tanaka et al. | 358/474 |
| 2001/0030775 A1 | * | 10/2001 | Suzuki | 358/475 |
| 2002/0149802 A1 | * | 10/2002 | Aoki | 358/461 |
| 2002/0186390 A1 | * | 12/2002 | Hara | 358/1.9 |
| 2003/0099000 A1 | * | 5/2003 | Hiromatsu | 358/461 |
| 2006/0209360 A1 | * | 9/2006 | Sakakibara | 358/474 |
| 2006/0274384 A1 | * | 12/2006 | Hayashi et al. | 358/498 |
| 2007/0046766 A1 | * | 3/2007 | Ono et al. | 347/228 |
| 2007/0070458 A1 | * | 3/2007 | Sheng | 358/504 |
| 2007/0223061 A1 | * | 9/2007 | Tanaka et al. | 358/497 |
| 2007/0236756 A1 | * | 10/2007 | Yamaguchi | 358/498 |
| 2008/0068682 A1 | * | 3/2008 | Morikawa | 358/521 |
| 2008/0180514 A1 | * | 7/2008 | Sekizawa et al. | 347/252 |
| 2008/0252941 A1 | * | 10/2008 | Hashizume | 358/474 |
| 2008/0266617 A1 | * | 10/2008 | Suzuki | 358/474 |
| 2008/0278774 A1 | | 11/2008 | Enami | |
| 2009/0034861 A1 | * | 2/2009 | Nakagawa et al. | 382/254 |
| 2009/0067009 A1 | * | 3/2009 | Yoshizawa | 358/461 |
| 2009/0086279 A1 | * | 4/2009 | Kawai | 358/461 |
| 2009/0128864 A1 | * | 5/2009 | Inage | 358/448 |

(Continued)

FOREIGN PATENT DOCUMENTS

| | | |
|---|---|---|
| JP | 11-289433 A | 10/1999 |
| JP | 2008-306707 A | 12/2008 |

*Primary Examiner* — Madelein A Nguyen (74) *Attorney, Agent, or Firm* — Canon USA, Inc., IP Division (57) ABSTRACT

Generation of shading correction data is started before an instruction to start reading of the document is input in a case in which time to generate shading correction data corresponding to a document reading mode is longer than time since the instruction to start reading of the document is received until the document is fed to reach a reading point, and generation of shading correction data is started after an instruction to start reading of the document is input in a case in which time to generate shading correction data corresponding to a document reading mode is shorter than time since the instruction to start reading of the document is received until the document is fed to reach a reading point.

5 Claims, 10 Drawing Sheets

(56) References Cited

U.S. PATENT DOCUMENTS

| | | | |
|---|---|---|---|
| 2009/0201519 A1* | 8/2009 | Hasegawa | 358/1.9 |
| 2009/0219579 A1* | 9/2009 | Baba | 358/448 |
| 2009/0244647 A1* | 10/2009 | Kawai | 358/463 |
| 2010/0053702 A1* | 3/2010 | Nagasaka | 358/475 |
| 2010/0177360 A1* | 7/2010 | Shimokawa et al. | 358/461 |
| 2010/0182652 A1* | 7/2010 | Tanaka et al. | 358/461 |
| 2010/0302605 A1* | 12/2010 | Suzuki | 358/474 |
| 2011/0019237 A1* | 1/2011 | Honda et al. | 358/3.26 |
| 2011/0075168 A1* | 3/2011 | Ikari | 358/1.9 |
| 2011/0181922 A1* | 7/2011 | Tanimoto et al. | 358/474 |
| 2011/0211238 A1* | 9/2011 | Sahara | 358/498 |
| 2011/0249302 A1* | 10/2011 | Tanaka et al. | 358/461 |

\* cited by examiner

| READING UNIT | READING POINT | MONOCHROME/ COLOR VARIABLE Vc | TIME TO GENERATE SHADING CORRECTION DATA Ts (msec) | FEEDING MODE VARIABLE Vf | |
|---|---|---|---|---|---|
| | | | | HIGH SPEED FEEDING MODE | LOW SPEED FEEDING MODE |
| | | | | DOCUMENT FEEDING TIME TO READING POINT Tf (msec) | |
| FRONT SIDE CCD LINEAR SENSOR 58 | PLATEN ROLLER 17 | COLOR MODE | 600 | 500 | 700 |
| | | MONOCHROME MODE | 300 | 500 | 700 |
| REVERSE SIDE CCD LINEAR SENSOR 20 | REVERSE SIDE READING ROLLER 19 | COLOR MODE | 900 | 740 | 940 |
| | | MONOCHROME MODE | 600 | 580 | 780 |

DOCUMENT READER

BACKGROUND OF THE INVENTION

1. Field of the Invention

The present invention relates to a document reader.

2. Description of the Related Art

In related art document readers, shading correction is performed to a read image using shading correction data in order to reduce variation ("shading") in the amount of light received along the longitudinal direction (i.e., the main scanning direction) of a linear sensor which reads a document. The shading correction data is generated in accordance with read luminance distribution in the main scanning direction in which a white component is read before the reading of the document is started. Usually, control is made to read the document after the generation of the shading correction data in response to a user instruction to start reading of the document. Recently, a method of starting generation of the shading correction data including switching-on of a light source in response to a user manipulation with which an instruction to start reading of the document other than an instruction to start reading of the document may be recognized in order to shorten the time to elapse before reading of the document is completed has been proposed (see the U.S. Patent Application Publication No. 2008/0278774). The user manipulation with which an instruction to start reading of the document may be recognized includes placing a document on a document table, an input operation other than the instruction to start reading of the document to a manipulation unit and closing a pressure board.

Recently, more compact automatic document feeders (hereinafter, "ADFs") and increased document reading speed contribute shorter time to elapse before a document fed from a document tray of the ADF reaches a document reading point. Therefore, in an apparatus described in the U.S. Patent Application Publication No. 2008/0278774, generation of shading correction data is started in response to a user manipulation with which an instruction to start reading of the document may be recognized in order to shorten the time to elapse between an issue of a user instruction to start reading of the document and completion of reading of the document.

It is not always enough, however, to start generation of shading correction data in advance of an issue of the instruction to start reading of the document. Since reading ability of a linear sensor easily varies due to self temperature rise at the start of the driving of the linear sensor, it is not desirable to start generation of the shading correction data in advance of the instruction to start reading of the document in a case in which generation of the shading correction data is completed between an issue of the instruction to start reading of the document and reading of the document is started. This is because, in this case, image quality may be impaired due to variation in reading ability after the generation of the shading correction data without any shortening of the time between an issue of the instruction to start reading of the document and the completion of reading of the document.

SUMMARY OF THE INVENTION

An aspect of the present invention includes a feeding unit which feeds a document, a reading unit which reads the document which is being fed by the feeding unit across a reading point; a manipulation unit which receives an instruction regarding a document reading mode and an instruction to start reading of the document, and a generation unit which generates shading correction data from a read value of a reference member of the reading unit, wherein the generation unit selects, in accordance with the document reading mode received by the manipulation unit, a first mode in which generation of the shading correction data is started before the instruction to start reading of the document is issued or a second mode in which generation of the shading correction data is started after the instruction to start reading of the document is issued.

Further features of the present invention will become apparent from the following description of exemplary embodiments with reference to the attached drawings.

DESCRIPTION OF THE EMBODIMENTS

Figure 1:
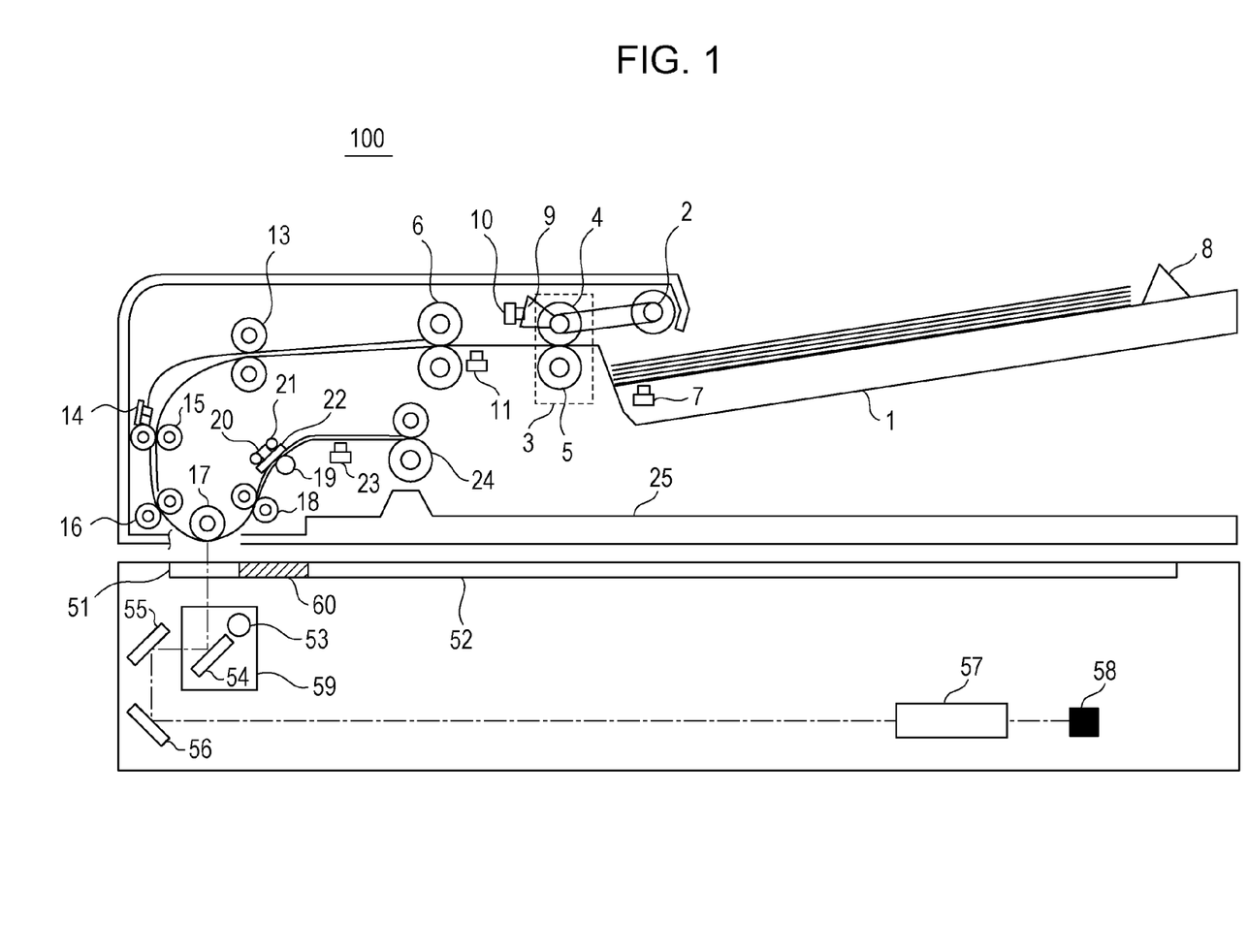
FIG. 1 is a sectional view of a document reader.

FIG. 1 is a sectional view of a document reader 100 which includes an automatic document feeder (hereinafter, ADF) of an embodiment. In a document flow reading mode, the ADF feeds a bundle of documents placed on a document tray 1 one at a time and reads an image on the document while the document is being fed. First, a pickup roller 2 feeds the uppermost document of the bundle of documents placed on the document tray 1. The documents fed by the pickup roller 2 are separated into one sheet by a separation roller 3 which is constituted by a feed roller 4 and a retard roller 5. Each document is fed through a post-separation sensor 11 and a pre-resist sensor 14 by a drawing roller 6 and a feeding roller 13 until its leading end abuts a resist roller 15. This configuration prevents oblique travelling of the documents.

The document which has passed the resist roller 15 is fed toward a document flow reading glass 51 and is fed to a platen upstream roller 16 and a platen roller 17. The platen roller 17 is in contact with the document flow reading glass 51. A front side of the document passing the platen roller 17 is illuminated with a light source 53. Light reflected from the document is led to a front side CCD linear sensor 58 ("first reading unit") through mirrors 54, 55 and 56 and a lens 57, and an image on the front side of the document is read by a linear sensor 58. The document fed by the platen roller 17 passes a platen downstream roller 18 and is fed to a reverse side reading roller 19. The reverse side reading roller 19 is in contact with the moving glass 22. A reverse side of the document passing the reverse side reading roller 19 is illuminated with the light source 21. An image on the reverse side of the document is read by a reverse side CCD linear sensor 20 ("second reading unit"). The document fed by the reverse side reading roller 19 passes an output sensor 23 and is output onto a document output tray 25 by a paper ejecting roller 24. In the document flow reading mode, as described above, one side of the document being fed across a reading point of the front side CCD linear sensor 58 is read by the front side CCD linear sensor 58 and the other side of the document being fed across the reading point of the reverse side CCD linear sensor 20 is read by the reverse side CCD linear sensor 20.

A white component 60 is read by the front side CCD linear sensor 58 before the start of the document in order to generate shading correction data of the image on the front side. A white component affixed to a part of the moving glass 22 is read in order to generate the shading correction data of a white level of the image on the reverse side. In the fixed document reading mode, the image of the document placed on the pressure board glass 52 is read by the front side CCD linear sensor 58 while a front side reading unit 59 is moving to the right.

Figure 2:
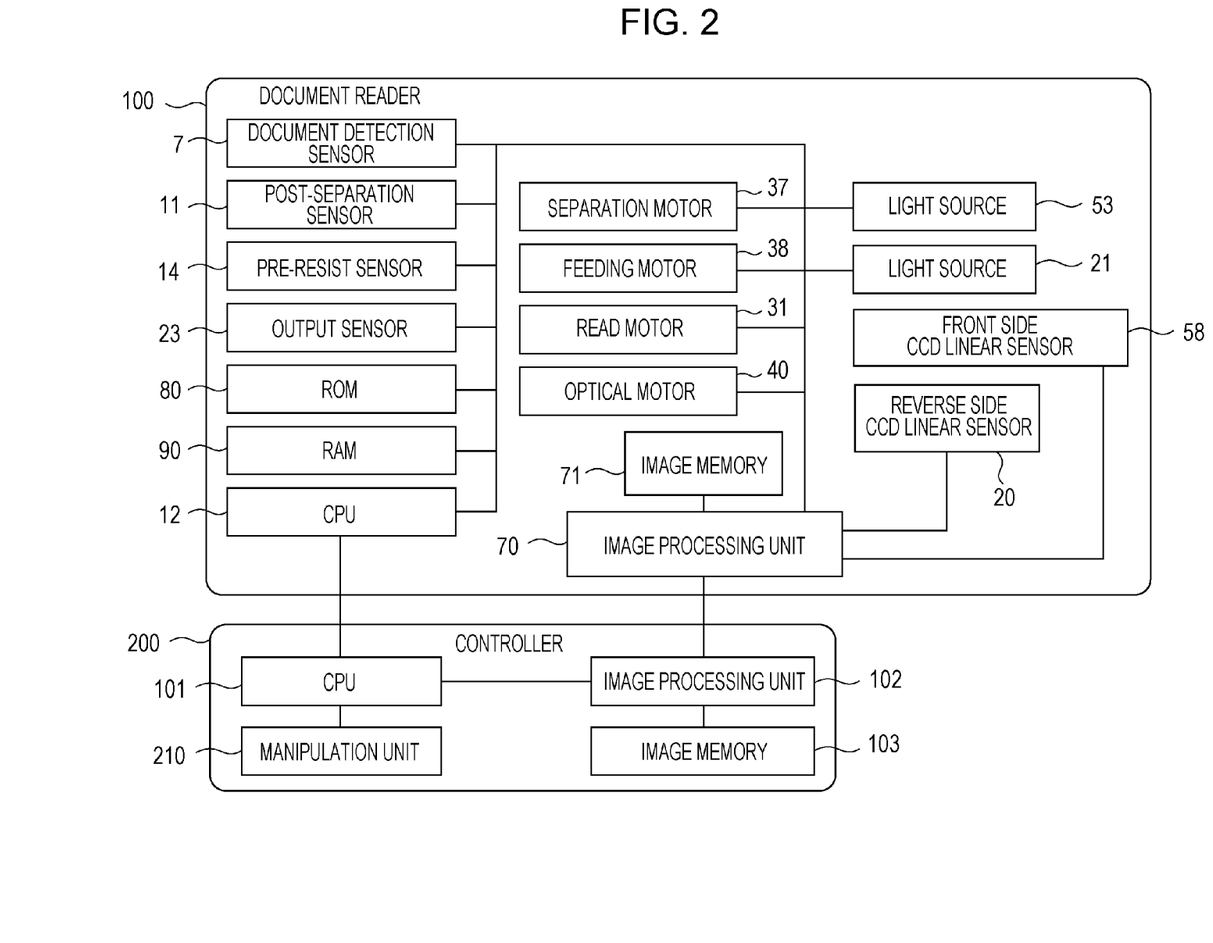
FIG. 2 is a control block diagram of the document reader.

FIG. 2 is a control block diagram of a document reader. The document reader 100 is connected to a controller 200 and is provided with a CPU 12, ROM 80 and RAM 90. The controller 200 is provided in, for example, an electrophotographic image forming device and controls an image forming device and the document reader 100. A control program is stored in the ROM 80. Input data and data for operation are stored in the RAM 90. The CPU 12 controls: a separation motor 37 which drives the pickup roller 2, the feed roller 4 and the retard roller 5; a feed motor 38 which drives the drawing roller 6 and the feeding roller 13; and a lead motor 31 which drives the platen upstream roller 16, the platen roller 17, the platen downstream roller 18, the reverse side reading roller 19 and the paper ejecting roller 24. The CPU 12 controls an optical motor 40 which moves the front side reading unit 59. Signals from the document detection sensor 7, the post-separation sensor 11, the pre-resist sensor 14 and the output sensor 23 are input to the CPU 12. The CPU 12 performs light control of the light sources 21 and 53. The image data read by the front side CCD linear sensor 58 and the reverse side CCD linear sensor 20 is temporarily stored in image memory 71 via an image processing unit 70.

A CPU 101 of the controller 200 transmits and receives data regarding image reading control to and from the CPU 12 via a serial communication line. The image processing unit 70 of the document reader 100 transmits the image data to an image processing unit 102 via an image line. The data received from the document reader 100 is stored in image memory 103 of the controller 200. An input operation by a user to the document reader 100 is performed on a manipulation unit 210 of the controller 200. Data in accordance with the setting on the manipulation unit 210 is input to the CPU 101.

Figure 3:
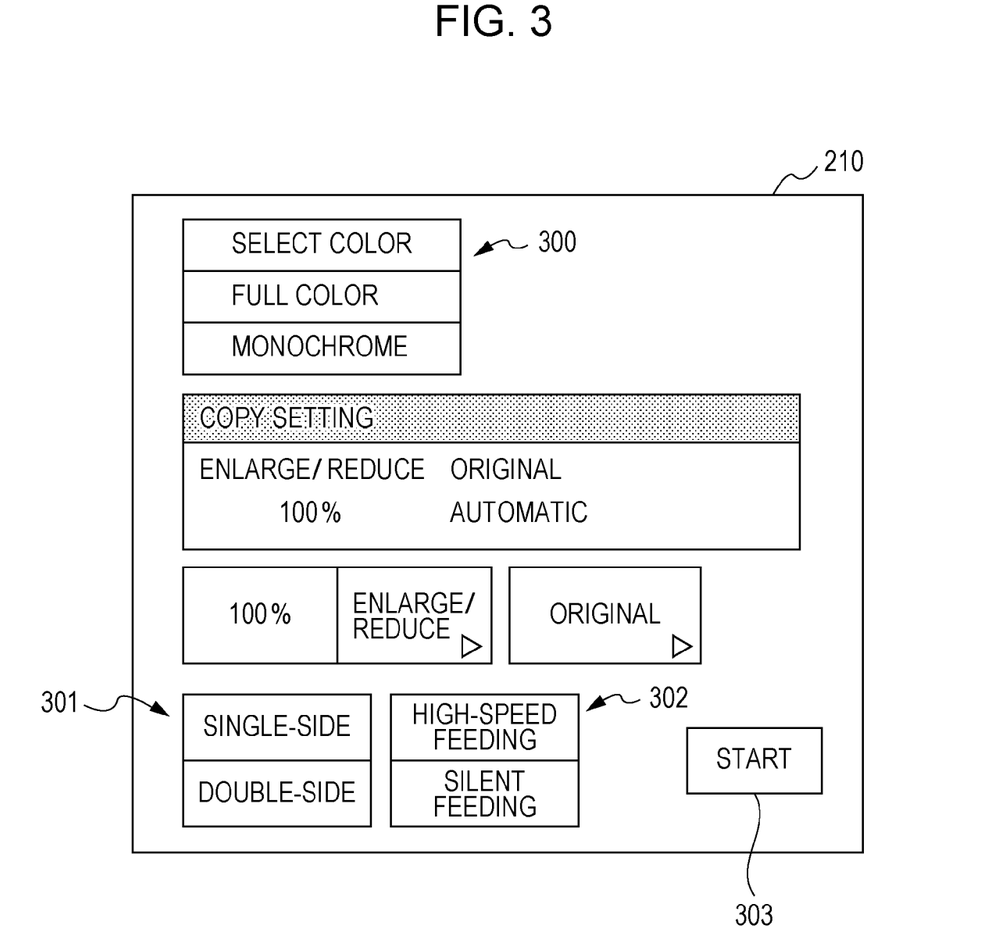
FIG. 3 is an external view of a manipulation unit of a controller.

FIG. 3 is an external view of the manipulation unit 210 of the controller 200. The manipulation unit 210 is a liquid crystal display unit which includes a touch panel at the upper portion. Soft keys for the setting of the document reading mode and for the instruction to start reading of the document may be displayed on the liquid crystal display unit. When a full color key of a color/monochrome select key 300 is pressed, a color reading mode is selected and the document is read in a full color mode. When a monochrome key is pressed, a monochrome reading mode is selected and the document is read in a monochrome mode. When a single-side key of a single-side/double-side select key 301 is pressed, a single-side mode is selected. When a double-side key is pressed, a double-side mode is selected. When a high-speed feeding key of a feeding mode key 302 is pressed, a high-speed feeding mode is selected. When a silent feeding key is pressed, a low-speed feeding mode is selected. In the high-speed feeding mode, the document is fed to the reading point at a predetermined speed and, in the low-speed feeding mode, the document is fed to the reading point at a speed lower than the predetermined speed. When a start key 303 is pressed, reading of the document in the selected document reading mode is started.

Figure 4:
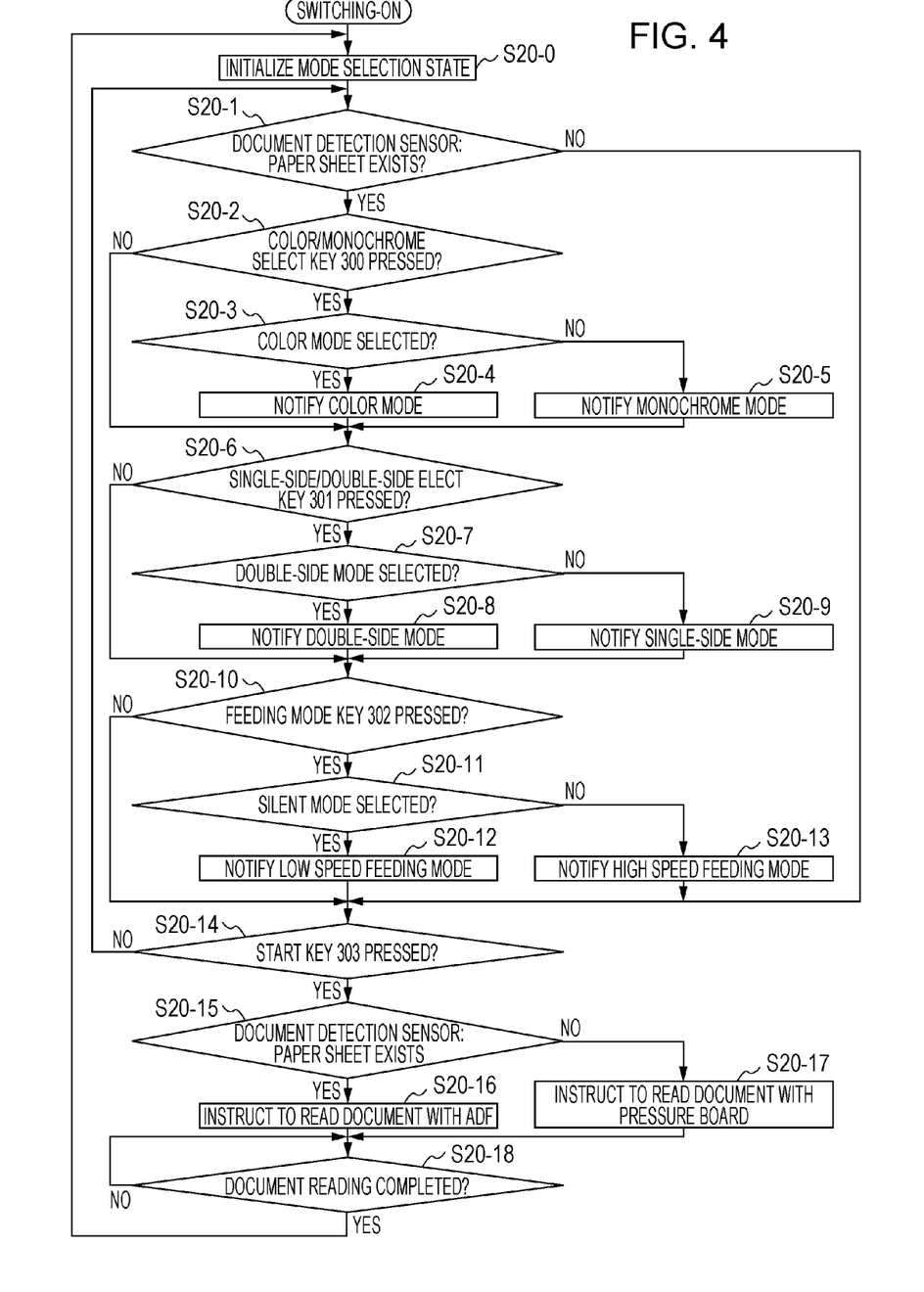
FIG. 4 is a control flowchart of the controller.

FIG. 4 is a control flowchart of the CPU 101 of the controller 200. The CPU 101 of the controller 200 initializes the mode select keys 300, 301 and 302 after the power supply is switched on (S20-0). In the present embodiment, the color mode, the single-side mode and the high-speed feeding mode are set to the initial values. Next, whether or not a paper sheet exists is determined by the document detection sensor 7 of the document reader 100 (S20-1). If it is determined that a paper sheet exists, it is determined whether or not the color/monochrome select key 300 is pressed (S20-2). If the color/monochrome select key 300 has been pressed, then it is determined whether or not the color mode is selected (S20-3). If the color mode has been selected, the CPU 12 of the document reader 100 is notified of the color mode as a document reading mode advance notice (S20-4). If the monochrome mode has been selected by means of the color/monochrome select key 300, the CPU 12 is notified of the monochrome mode as the document reading mode advance notice (S20-5).

The CPU 101 then determines whether or not the single-side/double-side select key 301 is pressed (S20-6). If the single-side/double-side select key 301 has been pressed, then it is determined whether or not the double-side mode is selected (S20-6). If the double-side mode has been selected, the CPU 12 is notified of the double-side mode as the document reading mode advance notice (S20-8). If the single-side mode has been selected by means of the single-side/double-side select key 301, the CPU 12 is notified of the single-side mode as the document reading mode advance notice (S20-9).

The CPU 101 then determines whether or not the feeding mode key 302 is pressed (S20-14). If the feeding mode key 302 has been pressed, it is determined whether or not the silent feeding mode is selected (S20-11). If the silent feeding mode has been selected, the CPU 12 is notified of the low-speed feeding mode as the document reading mode advance notice. If the high-speed feeding mode has been selected by means of the feeding mode key 302, the CPU 12 is notified of the high-speed feeding mode as the document reading mode advance notice.

The CPU 101 then determines whether or not the start key 303 is pressed (S20-14). If the start key 303 has been pressed, the document detection sensor 7 determines whether or not a paper sheet exists (S20-15). If a paper sheet exists, an instruction to start reading of the document with the ADF is issued to the CPU 12. If no paper sheet exists, an instruction to start reading of the document with the pressure board is issued to the CPU 12. After the document reading operation is completed (S20-18), the process returns to Step S20-0 and the mode selection state is initialized.

Figure 5:
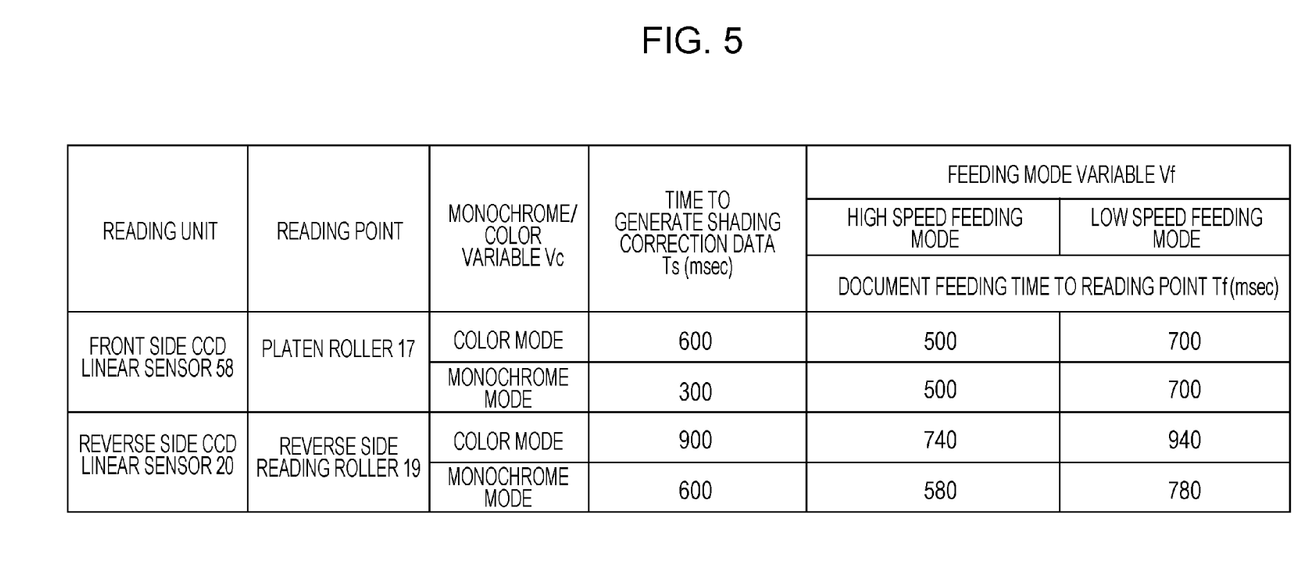
FIG. 5 illustrates a relationship between time to generate shading correction data and document feeding time.
Figure 6:
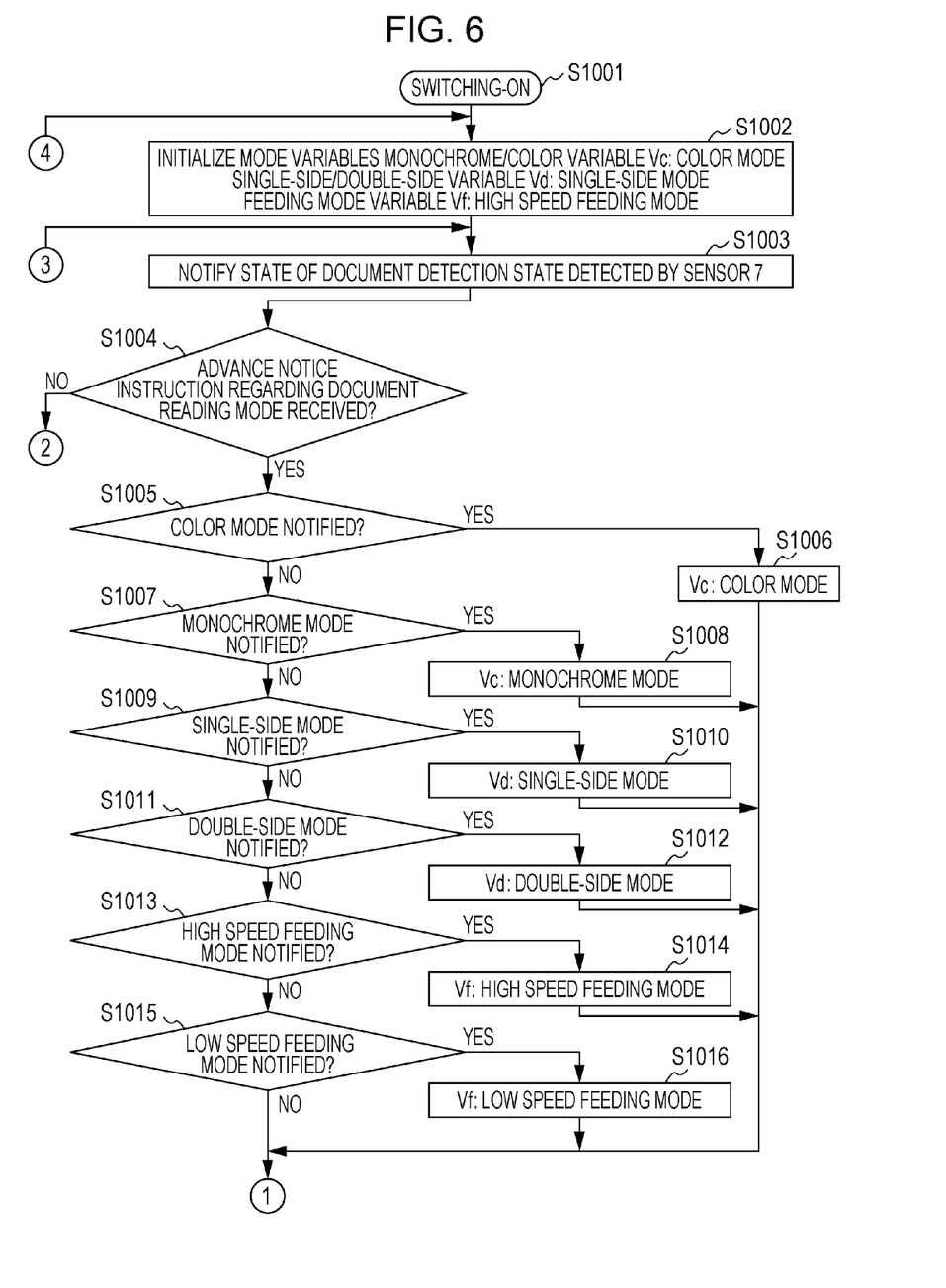
FIG. 6 is a control flowchart of the document reader.
Figure 7A:
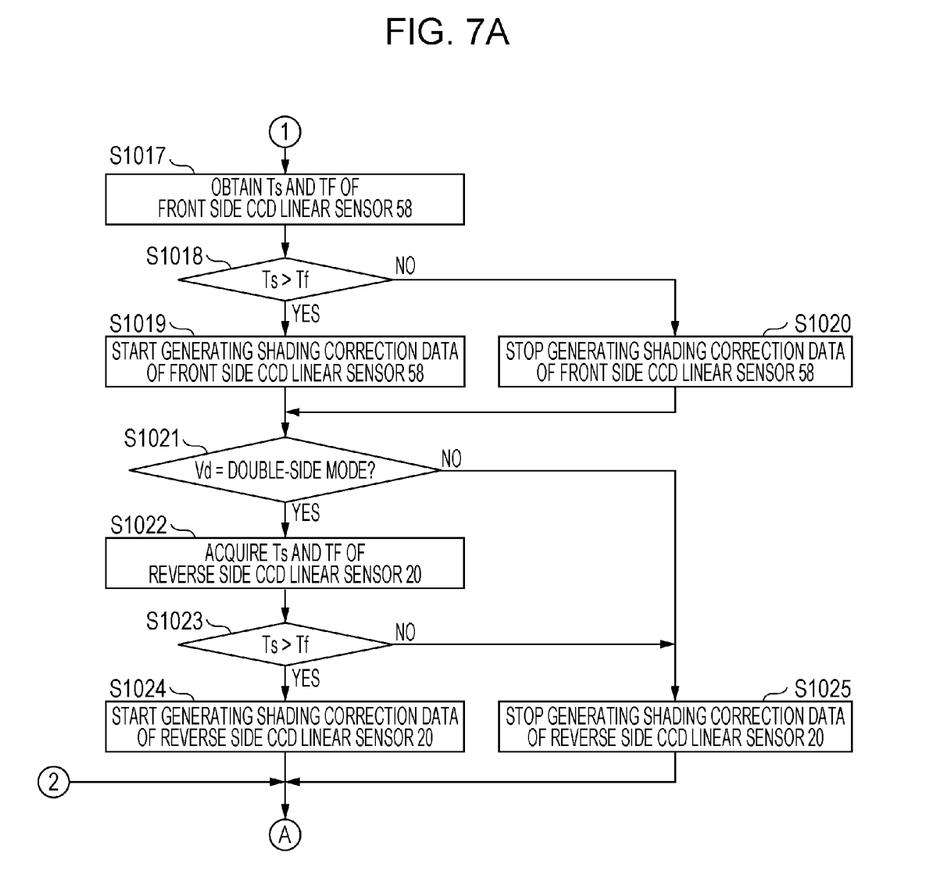
FIGS. 7A to 7C are control flowcharts of the document reader.
Figure 7B:
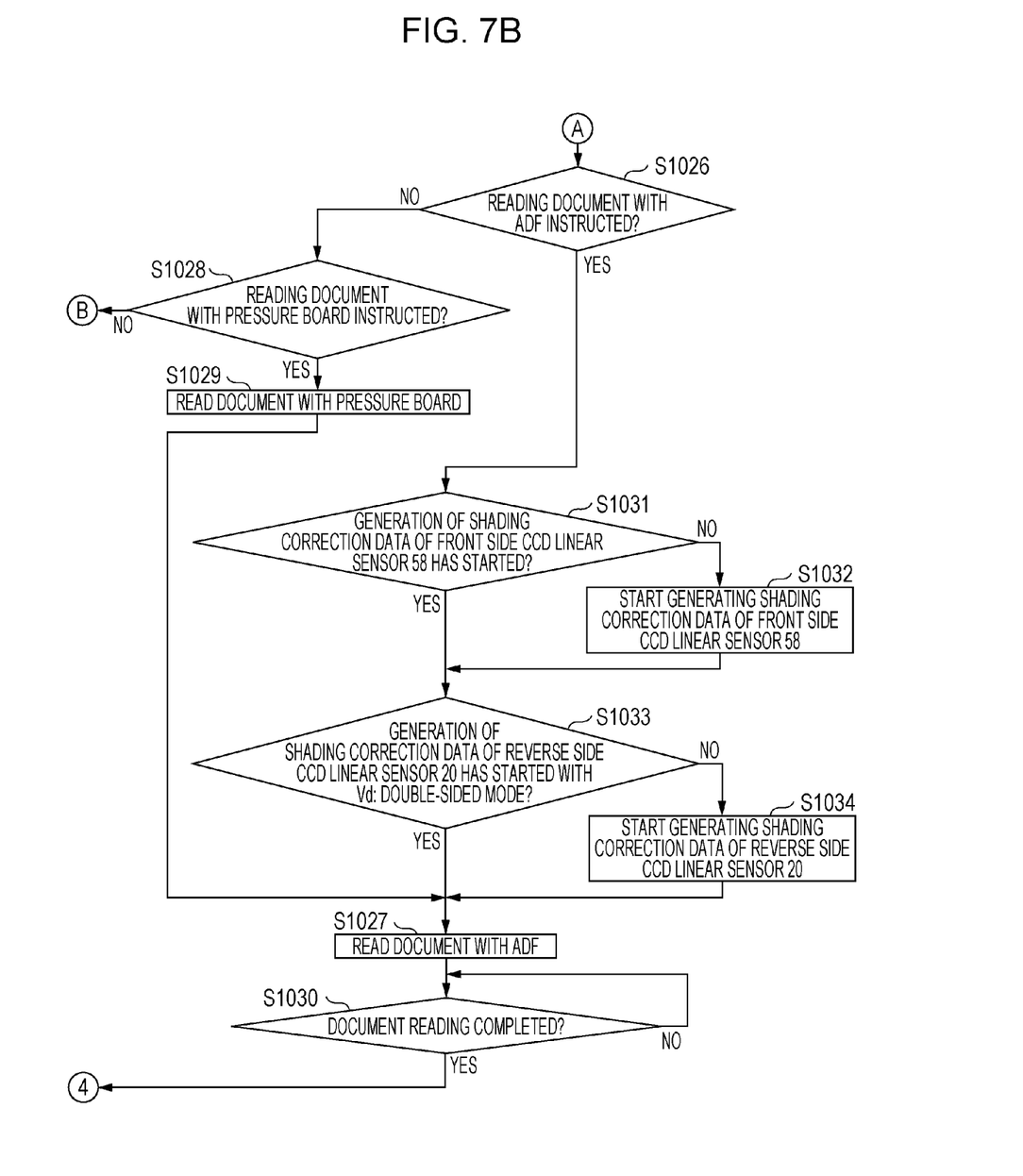
Figure 7C:
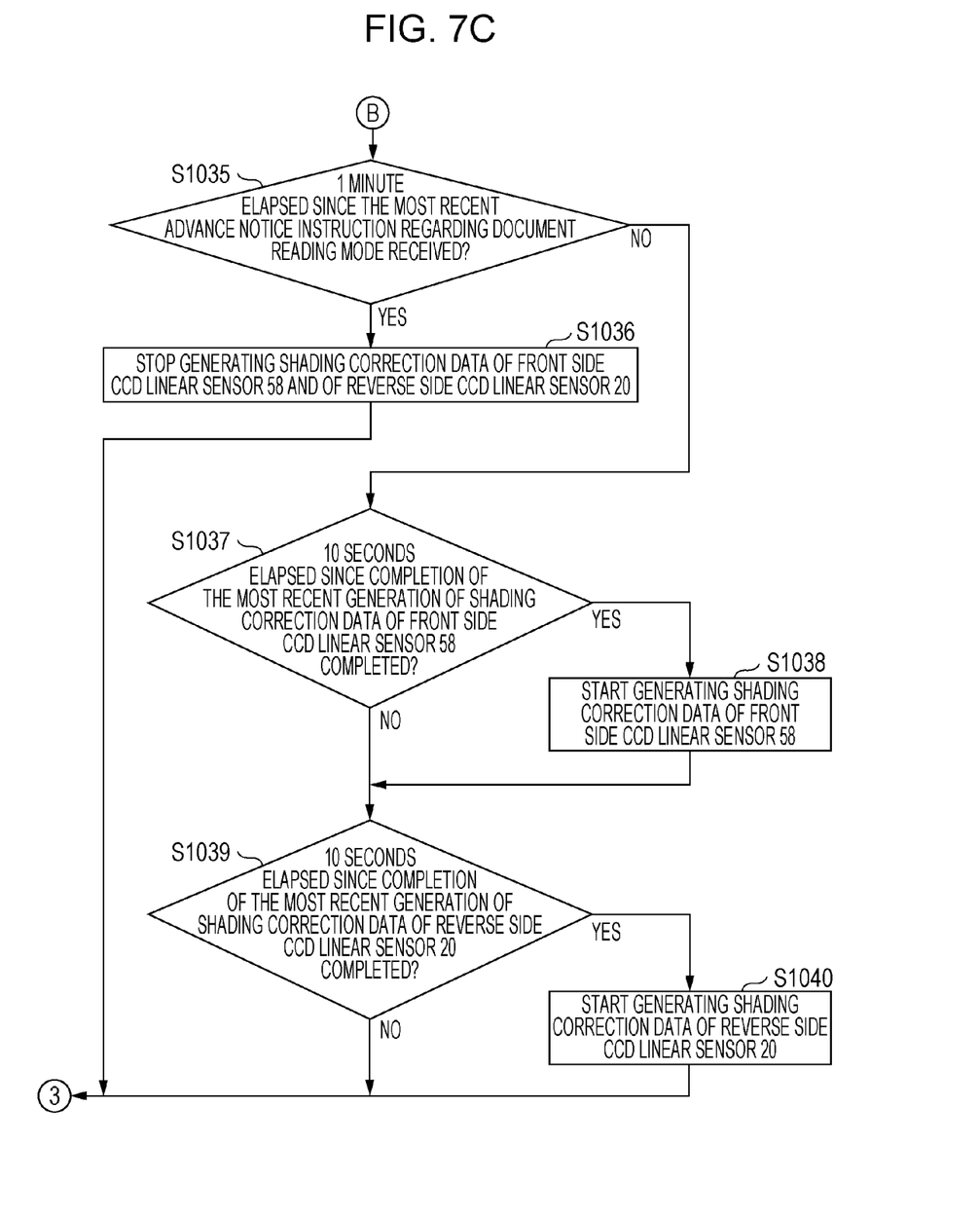

FIG. 5 illustrates a relationship between time to generate the shading correction data Ts and document feeding time Tf in each mode in the document flow reading mode. The document feeding time Tf is the time until the document fed from the document tray 1 reaches the reading point. A table illustrating the relationship between the time to generate the shading correction data Ts and the document feeding time Tf is stored in the ROM 80. The shading correction data is generated in the front side CCD linear sensor 58 in the following manner: the white component 60 is read with the light source 53 not being turned on in order to generate black shading correction data; and then, the light source 53 is turned on and the white component 60 is read in order to generate white shading correction data. The shading correction data is generated in the reverse side CCD linear sensor 20 in the following manner: a white component affixed to the moving glass 22 is searched for; the white component is read with the light source 21 not being turned on in order to generate black shading correction data; and then, the light source 21 is turned on and the white component is read in order to generate white shading correction data.

In the present embodiment, in the single-side mode and, at the same time, in the color mode, it is only necessary to consider the front side CCD linear sensor 58; therefore, the time to generate the shading correction data Ts is 600 milliseconds. In the single-side mode and, at the same time, in the monochrome mode, it is only necessary to consider the front side CCD linear sensor 58; therefore, the time to generate the shading correction data Ts is 300 milliseconds. In the double-side mode and, at the same time, in the color mode, it is necessary to also consider the reverse side CCD linear sensor 20; therefore, the time to generate the shading correction data Ts is 900 milliseconds. In the double-side mode and, at the same time, in the monochrome mode, it is necessary to also consider the reverse side CCD linear sensor 20, the time to generate the shading correction data Ts is 600 milliseconds. In the reverse side CCD linear sensor 20 used in the double-side mode, it is necessary to search for the white member affixed to the moving glass 22 and therefore the time to generate the shading correction data Ts is longer than that in the single-side mode by 300 milliseconds. In the single-side mode and, at the same time, in the high-speed feeding mode, the document feeding time until the document fed from the document tray 1 reaches the front side reading point (i.e., the platen roller 17) is 500 milliseconds in both the color mode and monochrome mode. In the single-side mode and, at the same time, in the low-speed feeding mode, the document feeding time until the document reaches the front side reading point is 700 milliseconds in both the color mode and the monochrome mode. In the double-side mode and, at the same time, in the high-speed feeding mode, the document feeding time until the document fed from the document tray 1 reaches a reverse side reading point (i.e., the reverse side reading roller 19) is 740 milliseconds in the color mode and is 580 milliseconds in the monochrome mode. In the double-side mode and, at the same time, in the low-speed feeding mode, the document feeding time until the document reaches the reverse side reading point is 940 milliseconds in the color mode and is 780 milliseconds in the monochrome mode.

FIGS. 6 and 7A to 7C are control flowcharts of the CPU 12 of the document reader 100. First, after the power supply is switched on, the CPU 12 (S1001) initializes a monochrome/color variable Vc to the color mode, a one-side/both-side variable Vd to a single-side mode and a feeding mode variable Vf to a high-speed feeding mode on the RAM 90 (S1002). The CPU 12 then notifies the CPU 101 of the controller 200 of the document detection state detected by the document detection sensor 7 (S1003). The CPU 12 determines whether or not a document reading mode advance notice is received from the CPU 101 (S1004). If the mode advance notice has been received, values of the variable Vc, Vd and Vf corresponding to the received mode advance notice are updated (Steps S1005 to S1016). Next, the time to generate shading correction data Ts and the document feeding time Tf of the front side CCD linear sensor 58 are obtained with reference to the table of FIG. 5 (S1017). The CPU 12 then determines whether or not Ts>Tf is true (S1018). If Ts>Tf is true, generation of the shading correction data of the front side CCD linear sensor 58 is started (S1019). If it is determined at Step S1018 that Ts>Tf is not true, generation of the front side shading correction data is stopped, and driving of the light source 53 and the front side CCD linear sensor 58 is stopped (S1020). The CPU 12 then determines whether or not the variable Vd is the double-side mode (S1021). If the variable Vd is the double-side mode, the time to generate the shading correction data Ts and the document feeding time Tf are obtained with reference to the table of FIG. 5 (S1022). The CPU 12 then determines whether or not Ts>Tf is true (S1023). If Ts>Tf is true, generation of the shading correction data of the reverse side CCD linear sensor 20 is started (S1024). If it is determined at Step S1021 that the variable Vd is not the double-side mode, or if it is determined at Step S1023 that Ts>Tf is not true, generation of reverse side shading correction data is stopped, and driving of the light source 21 and the reverse side CCD linear sensor 20 is stopped (S1025).

The CPU 12 then determines whether an instruction for document reading operation with the ADF has been received from the CPU 101 (S1026). If the instruction for document reading operation with the ADF has been received, it is determined whether or not generation of the shading correction data of the front side CCD linear sensor 58 has already been started (S1031). If generation of the shading correction data has not been started yet, generation of the shading correction data of the front side CCD linear sensor 58 is started (S1032). After generation is started, or if it is determined at Step S1031 that generation of the shading correction data of the front side CCD linear sensor 58 has already started, then it is determined whether or not generation of the shading correction data of the reverse side CCD linear sensor 20 has already been started (S1033). If generation of the shading correction data has not been started yet, generation of the shading correction data of the reverse side CCD linear sensor 20 is started (S1034). After generation is started, or if it is determined at Step S1033 that generation of the shading correction data of the reverse side CCD linear sensor 20 has already started, the document reading operation with ADF is started (S1027). When the document reading operation is completed (S1030), the process returns to Step S1002. If the instruction for document reading operation with the ADF has not been received at Step S1026, it is determined whether or not the instruction for document reading operation with the pressure board has been received (S1028). If the instruction for document reading operation with the pressure board has been received, generation of the shading correction data of the front side CCD linear sensor 58 is performed and then the document reading operation with the pressure board is started (S1029). When the document reading operation is completed (S1030), the process returns to Step S1002. If the instruction for document reading operation with the pressure board has not been received at Step S1028, it is determined whether or not one minute has elapsed since the most recent document reading mode advance notice is received (S1035). If one minute has elapsed, generation of the shading correction data of the front side CCD linear sensor 58 and generation of the reverse side CCD linear sensor 20 are stopped (S1036) and the process returns to Step S1003 with the values of the variables Vc, Vd and Vf unchanged. If one minute has not elapsed since the most recent document reading mode advance notice is received at Step S1035, then it is determined whether or not 10 seconds have elapsed since generation of the shading correction data of the most recent front side CCD linear sensor 58 is completed (S1037). If 10 seconds have elapsed, generation of the shading correction data of the front side CCD linear sensor 58 is started (S1038). After generation is started or if 10 seconds have not elapsed at Step S1037, it is determined whether or not 10 seconds have elapsed since generation of the shading correction data of the most recent reverse side CCD linear sensor 20 is completed (S1039). If 10 seconds have elapsed, generation of the shading correction data of the reverse side CCD linear sensor 20 is started (S1040). After generation is started or if 10 seconds have not elapsed at Step S1039, the process returns to S1003 with the values of the variables Vc, Vd and Vf unchanged.

Figure 8A:
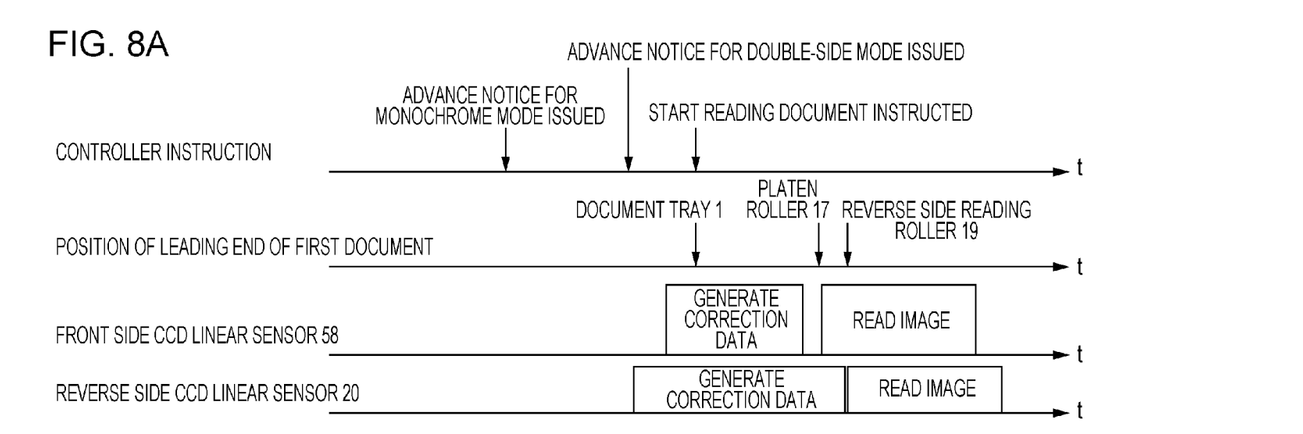
FIGS. 8A and 8B are timing charts illustrating a relationship among an instruction from the controller, feeding of a document and processing of a linear sensor.
Figure 8B:
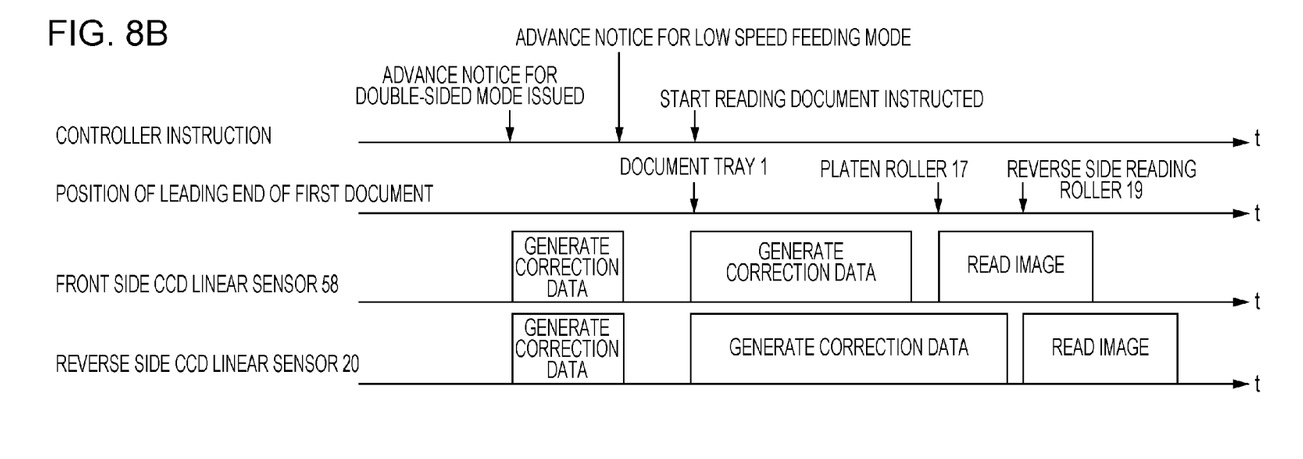

FIGS. 8A and 8B are timing charts illustrating a relationship among an instruction from the controller, feeding of the document and processing of the linear sensor. The horizontal axis represents time and the vertical axis represents the kind of instruction from the controller 200, the document position of the first sheet, the operation of the front side CCD linear sensor 58 and the operation of the reverse side CCD linear sensor 20. FIG. 8A illustrates an operation in a case in which the user selected the monochrome mode and the double-side mode and then pressed the start key 303. If a monochrome mode advance notice is notified, no shading correction data is generated for both the front and reverse sides; when a double-side mode advance notice is notified thereafter, correction data is generated for only the reverse side CCD linear sensor 20. Then, when the instruction to start reading of the document is issued, generation of the shading correction data of the front side CCD linear sensor 58 is started. In this case, as compared with a case in which generation of the shading correction data for both the front and reverse sides is started at the time when the instruction to start reading of the document is issued, a possibility that the document is not capable of passing the reverse side reading point until the completion of generation of the shading correction data is reduced; and therefore it is possible to reduce time since the user presses the start key 303 until the completion of reading of the document.

FIG. 8B illustrates an operation in a case in which the user selected the double-side mode and the low-speed feeding mode and then pressed the start key 303. If the double-side mode advance notice is notified, the shading correction data is generated for both the front and reverse sides; and then, correction of the shading data is stopped when notification of the low-speed feeding mode is instructed. Then, when an instruction to start reading of the document is issued, generation of the shading correction data for both the front and reverse sides is started again. In this case, as compared with a case in which generation of the correction data is started at the time when the double-side mode advance notice is issued, the time since the completion of generation of the correction data until the reading is started is reduced; therefore, image quality of the read image is increased.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-282234 filed Dec. 17, 2010, which is hereby incorporated by reference herein in its entirety.

What is claimed is:

1. A document reader comprising:
a document tray on which a document is placed;
a feeding unit which feeds the document;
a reading unit which reads the document which is being fed by the feeding unit across a reading point;
a operation unit which receives a user's instruction regarding a document reading mode and an instruction to start reading of the document; and
a generation unit which generates shading correction data from a read value of a reference member of the reading unit,
wherein the generation unit selects, in accordance with the document reading mode received by the operation unit, a first mode in which generation of the shading correction data is started before the operation unit receives the user's instruction to start reading of the document, or a second mode in which generation of the shading correction data is started after the operation unit receives the user's instruction to start reading of the document,
wherein a time period for generating the shading correction data corresponding to the first mode is longer than a time period from the timing when the instruction to start reading of the document is made until the feeding unit feeds the document up to the reading point, and
wherein a time period for generating the shading correction data corresponding to the second mode is shorter than a time period from the timing when the instruction to start reading of the document is made until the feeding unit feeds the document up to the reading point.

2. The document reader according to claim 1, wherein: the document reading mode includes a color reading mode and a monochrome reading mode,
wherein the color reading mode is the first mode, and
wherein the monochrome reading mode is the second mode.

3. The document reader according to claim 1, further comprising a second reading unit which reads another side of the document read by the reading unit,
wherein the document reading mode includes a one-side reading mode and a double-side reading mode,
wherein the one-side reading mode is the first mode, and
wherein the double-side reading mode is the second mode.

4. The document reader according to claim 1, wherein document feeding time in which the document is fed by the feeding unit to reach the reading point differs depending on the document reading mode.

5. The document reader according to claim 1,
wherein the document reading mode includes a high-speed feeding mode and a low-speed feeding mode, and
wherein a feeding speed in the low-speed feeding mode is lower than a feeding speed in the high-speed feeding mode.

* * * * *